(12) United States Patent
Dunklau (10) Patent No.: US 8,256,157 B1
(45) Date of Patent: Sep. 4, 2012

(54) FUMIGATION APPARATUS FOR BUILDINGS

(76) Inventor: Dana Dunklau, Delevan, WI (US)

( * ) Notice: Subject to any disclaimer, the term of this patent is extended or adjusted under 35 U.S.C. 154(b) by 51 days.

(21) Appl. No.: 12/806,699

(22) Filed: Aug. 19, 2010

(51) Int. Cl.
*A01M 13/00* (2006.01)

(52) U.S. Cl. .......................................... 43/125

(58) Field of Classification Search .............. 43/125, 43/129, 130, 124, 132.1, 900; 119/650, 677, 119/678
See application file for complete search history.

(56) References Cited

U.S. PATENT DOCUMENTS

| | | | | |
|---|---|---|---|---|
| 1,756,453 A | * | 4/1930 | Davey et al. | 47/57.5 |
| 2,319,410 A | * | 5/1943 | Leary | 52/220.8 |
| 2,460,554 A | * | 2/1949 | Vogel | 239/282 |
| 4,823,505 A | * | 4/1989 | Jackson | 43/124 |
| 5,246,675 A | * | 9/1993 | Castronovo | 422/305 |
| 5,309,669 A | * | 5/1994 | Jackson | 43/124 |
| 6,840,004 B1 | * | 1/2005 | Allen | 43/124 |
| 6,966,143 B2 | * | 11/2005 | Allen | 43/124 |
| 7,481,023 B1 | * | 1/2009 | Disler | 43/132.1 |
| 7,908,791 B1 | * | 3/2011 | Brash | 43/125 |
| 2007/0199237 A1 | * | 8/2007 | Broadbent | 43/125 |

FOREIGN PATENT DOCUMENTS

JP 01030533 A * 2/1989

* cited by examiner

*Primary Examiner* — Son T Nguyen
*Assistant Examiner* — Shadi Baniani
(74) *Attorney, Agent, or Firm* — G. Brian Pingel; Camille L. Urban; David M. Breiner (57) ABSTRACT

A fumigation apparatus for decontamination or disinfection of a building having a fumigation pollution source, a fog generator, a hose for conveying fog to a building to be fumigated and a nozzle on the outer end of said hose that includes a body portion and a radially extending flange that has at least one slot so that when said apparatus is pumping fog into said building air is drawn through the slots to improve the flow of fog into the building.

10 Claims, 7 Drawing Sheets

FUMIGATION APPARATUS FOR BUILDINGS

BACKGROUND OF THE INVENTION

1. Field of the Invention

The present invention relates in general to a fumigation apparatus for the decontamination, disinfection or delousing of buildings and more specifically involves an apparatus that substantially reduces the danger involved in providing such fumigation.

2. Description of the Related Art

Buildings often become contaminated with infestations of various types of undesirable populations such as insects, bugs and germs that create a high risk factor of disease or discomfort for inhabitants of the buildings. This is particularly true in the agricultural industry in which buildings are utilized for housing highly dense populations of animals and birds such as cattle, pigs, turkeys or chickens.

The most common practice in the agricultural industry today for the decontamination of buildings involves the spraying of toxic chemicals by workers that use sprayers inside the buildings. Although the workers typically wear safety equipment to protect them from the toxic chemicals that are sprayed, it is highly undesirable to expose workers to the risk of somehow being contaminated by the chemicals. Although this current procedure presents a risk to workers, because it is highly essential that the entire interior of the buildings must be reached by the fumigating material, there is currently no satisfactory solution for avoiding such risk.

The present invention is designed to provide a fumigation apparatus for the decontamination or disinfection of buildings in a highly efficient manner that eliminates the need for workers to be inside the buildings during the fumigation process.

SUMMARY OF THE INVENTION

The present invention provides a fumigation apparatus for decontamination or disinfection of buildings that comprises a source of fumigation solution, a fog generator that provides an output flow of a fog of said solution, a hose for conveying fog to a building to be fumigated and a nozzle on the outer end of the hose through which said fog is pumped into said building through an inlet port in the sidewall of the building, which port has a nozzle receiving receptacle.

The nozzle has a body portion that includes a central bore axially aligned in said body portion through which said fog is pumped into the building. A flange extends outwardly from the body portion and is coaxially aligned with the bore, said flange including at least one slot so that when the apparatus is pumping fog into the building, air is drawn through said at least one slot as a result of a venturi effect to improve the flow of fog into the building.

The nozzle further includes a pair of oppositely positioned extension arms extending outwardly from the body, each of said arms having a pair of handles aligned parallel with said bore on one side of said arms and a pair of hook shaped engagement members on the other side that are positioned to engage securement pins located on the nozzle receiving receptacle.

The foregoing and other advantages of the present invention will appear from the following description. In the description, reference is made to the accompanying drawings, which form a part hereof, and in which there is shown by illustration and not of limitation a specific form in which the invention may be embodied. Such embodiment does not represent the full scope of the invention, but rather the invention may be employed in a variety of other embodiments and reference is made to the claims herein for interpreting the breadth of the invention.

DETAILED DESCRIPTION OF THE PREFERRED EMBODIMENT

Figure 1:
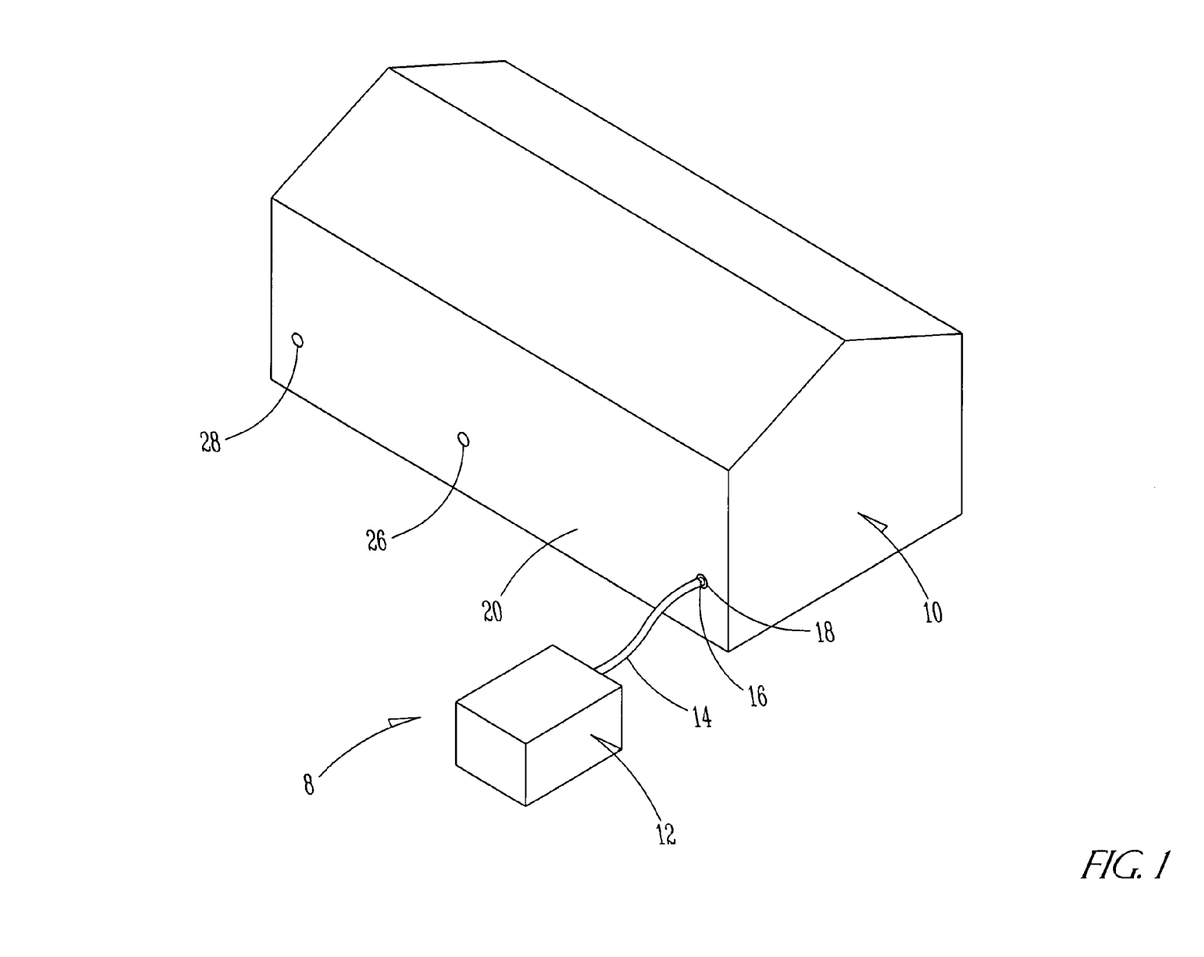
FIG. 1 is a perspective diagrammatic view showing the apparatus of the present invention in association with a building to be fumigated.

Referring now to the drawings and with reference first to FIG. 1, a diagrammatic view is shown of a typical animal confinement building for housing highly dense populations of animals and birds such as cattle, pigs, turkeys or chickens. It is critical in preventing or containing the spread of disease to the livestock contained in the building 10 that decontamination or disinfection of the interior of such building be performed whenever there is a change over from one generation of livestock to the next or if there is an outbreak of disease or sickness in the livestock inhabiting the building 10.

The present invention provides an improved fumigation apparatus 8 for performing the decontamination or disinfection of the building 10 and does so in a manner that provides highly efficient results. More importantly, the present invention provides such results without exposing workers who are conducting the building fumigation to the risk of being exposed to highly toxic chemicals during the fumigation operation. As indicated in FIG. 1, the fumigation apparatus 8 of the present invention is designed to provide fumigation to the building 10 from the outside. This is accomplished via the use of a fog generator 12 that supplies a fog of fumigation solution to the building 10 through the use of a hose 14 and a nozzle 16 that is inserted into an inlet port 18 approximately six inches in diameter preferably in a sidewall 20 of the building 10. Depending on the size of the building 10, in addition to using the inlet 18, it may also be advisable to supply the fumigation fog from the generator 12 to inlets 26 and 28 spaced along the building sidewall 20.

In view of the fact that the fumigation apparatus 8 operates from outside the building 20, it is critical for optimum efficiency that the fog generator 12 produces a fumigation fog that has a high drift capacity so that it can saturate the entire interior of the building 10 with a fumigation solution. To produce such a fumigation fog, it is preferable for the generator 12 to be an ultra-low-volume (ULV) cold fog unit that generates fog droplets by using a high volume of air at low pressure to enable droplets of a precise size to be generated. ULV generators can dispense formulations in a more concentrated form since less diluent is required. Also, the ability to be able to calibrate the generator 12 to produce droplets of an optimum size for the type of chemical being used makes ULV generation the method of choice whenever possible. Also, preferably the generator should have a blower with a rating of from 150 to 400 cfm to be able to produce a smaller fog droplet size. It has been found that one type of generator particularly adapted for producing the desired form of fumigation fog are foggers manufactured by Curtis Dyna-Fog, Ltd.

Preferably, the fumigation fog should be comprised of droplets ranging in size from 5 to 50 microns to provide for maximum drift of the fog and to comply with labels. Therefore, the generator 12 should be set at a blower speed to produce such droplets. Droplet size is a product of energy and, therefore, air pressure is utilized to deliver energy to the fluid. Acceptable ULV droplets are preferably produced under high volume low pressure conditions which are highly advantageous in delivering the fumigation fog throughout the building 10. This is why the building 10 needs no more than 3 or possibly 4 inlet ports to insure that the entire building is acceptably fumigated. This is also the reason for utilizing the generator 12 with a high capacity as that described because a larger machine creates a much bigger push of fog into the building 10 making the fumigation process more efficient by increasing the drift of the fog. Although low volume high pressure conditions may be employed, building penetration by the fog would likely not be complete.

A wide variety of disinfectants or pesticides can be utilized with the present invention depending upon the results desired. Preferably, the pesticide can be a natural pyrethrum or synthetic pyrethroid such as permethrin, deltamethrin, bifenthrin, fluvalinate, fenvalerate, esfenvalerate, lambda cyhalothrin, tetramethrin, tralomethrin, cyfluthrin, resemethrin, sumithrin, imiprothrin, prallethrin (ETOC®), allethrin, bioallethrin, esbiothrin, s-bioallethrin (ESBIOL®), d-allethrin; cypermethrin; isomeric forms thereof such as zeta cypermethrin and tau fluvalinate; channel blocking insecticide such as a phenyl pyrazole (fipronil); acetylcholinesterase inhibitor such as a carbamate (carbaryl and bendiocarb); oxadiazines such as indoxacarb; organophosphate such as a chlorpyriphos (DURSBAN®) and acephate (ORTHENE®); neonicotinoid insecticide such as dinotefuran (SHURIKEN®); thiamethoxam; imidacloprid; acetamiprid; thiacloprid; clothianidin; nitenpyran; insect growth regulator such as benzoylphenyl urea (such as diflubenzuron (DIMILIN®), teflubenzuron, flufenoxuron, bistrifluoron, hexaflumuron; juvenile hormone mimic such as pyriproxifen (SUMI-LARV®), methoprene and fenoxycarb; fermentation insecticide such as abamectin, spiromesifen, spinosad and *Bacillus thuringiensis*; plant oil insecticide such as cinnamon, rosemary, wintergreen, citrus and clove oils; acaracide; miticide; fungicide; herbicide and combinations thereof. Disinfectants or pesticides that exhibit advantageous results with the apparatus 8 and are currently in the marketplace are formaldehyde, oxine, Synergize, Tek-trol, Bio-Phene, Virkons, Virocid and 904, n-Alkyl (60% C14, 30% C16, 5% C12, 5% C18) Dimethyl benzyl ammonium chloride (Amount 2.25%) n-Alkyl (68% C12, 32% C14) Dimethyl benzyl ammonium chloride (Amount 2.25%); 3-(trimethoxysilyl) propyl dimethyl octadecyl ammonium chloride CAS #27668-52-6; Alkenyl* dimethyl ammonium chloride *(75% C18', 25% C16'); Alkyl dimethyl ethylbenzyl ammonium cyclohexyl sulfamate CAS#71808-54-3 CAS#37335-68-5; Alkyl trimethyl ammonium bromides CAS#68424-92-0; Alkyl* dimethyl benzyl ammonium chloride *(41% C14, 28% C12, 19% C18, 12% C16 CAS#68391-01-5; Decyl-N-methyl-N-(3-trimethoxysilyl)propyl)-1-decanaminium chloride CAS#68959-20-6; Diallyl dimethyl ammonium chloride polymers CAS#26062-79-3; Didecyl dimethyl ammonium chloride CAS#7173-51-5; Dodecylbenzyl trimethyl ammonium chloride CAS#1330-85-4; N-isononyl-N,N-dimethyl decanaminium chloride CAS#138698-36-9; Octyl decyl dimethyl ammonium chloride CAS#32426-11-2; Oxydiethylene bis(alkyl dimethyl ammonium chloride), alkyl derived from coconut oil fatty acids CAS#68607-28-3; Tetradecyl dimethyl benzyl ammonium chloride CAS#139-08-2; Ortho-benzyl-para-chlorophenol CAS#120-32-1; Ortho-benzyl-para-chlorophenol, sodium salt CAS#3184-65-4; Para-chloro-meta-cresol CAS#59-50-7; Sodium p-chloro-m-cresolate CAS#15733-22-9; Triclosan CAS#3380-34-5.

The generator 12 must have the capacity for providing a maximum output of the fog solution of approximately 50 to 90 ounces per minute to provide an acceptable disinfecting fumigation fog. However, for the purpose of supplying an insecticide to the building 10 the fog solution can be applied at approximately 10 to 25 ounces per minute. Of course, the size of the building 10 can appreciably affect the efficacy of the fumigation process. The present invention is designed to handle the decontamination or disinfection of relatively large scale buildings in the range of 15 feet high by 40 feet wide by 300 feet long which amounts to 216 thousand cubic feet of interior volume to cover. For a building of this size, it typically takes one and one-half hours to apply the fumigation fog and will require approximately 18 gallons of fumigant.

Due to the use of the ULV foggers as the generator 12, a fogging solution can be applied much more quickly than by any other method which is important due to the fact that when killing flies in the building 10 while it is full of livestock, the ventilation system must be turned off. Thus, the efficiency of application provided by the apparatus 8 allows for the fog to hang long enough to impinge on the flies before the livestock will suffocate.

To increase the efficiency of applying a fumigation fog to the building 10, as well as increase safety in doing so, the nozzle 16 has been designed to insure a hands free chemical application as it is designed to lock in place in the inlet ports 18, 26 or 28. Additionally, the nozzle 16 is designed to allow airflow from the outside into the building 10 to generate a venturi type affect that increases the carry of the fog into the building.

Figure 2:
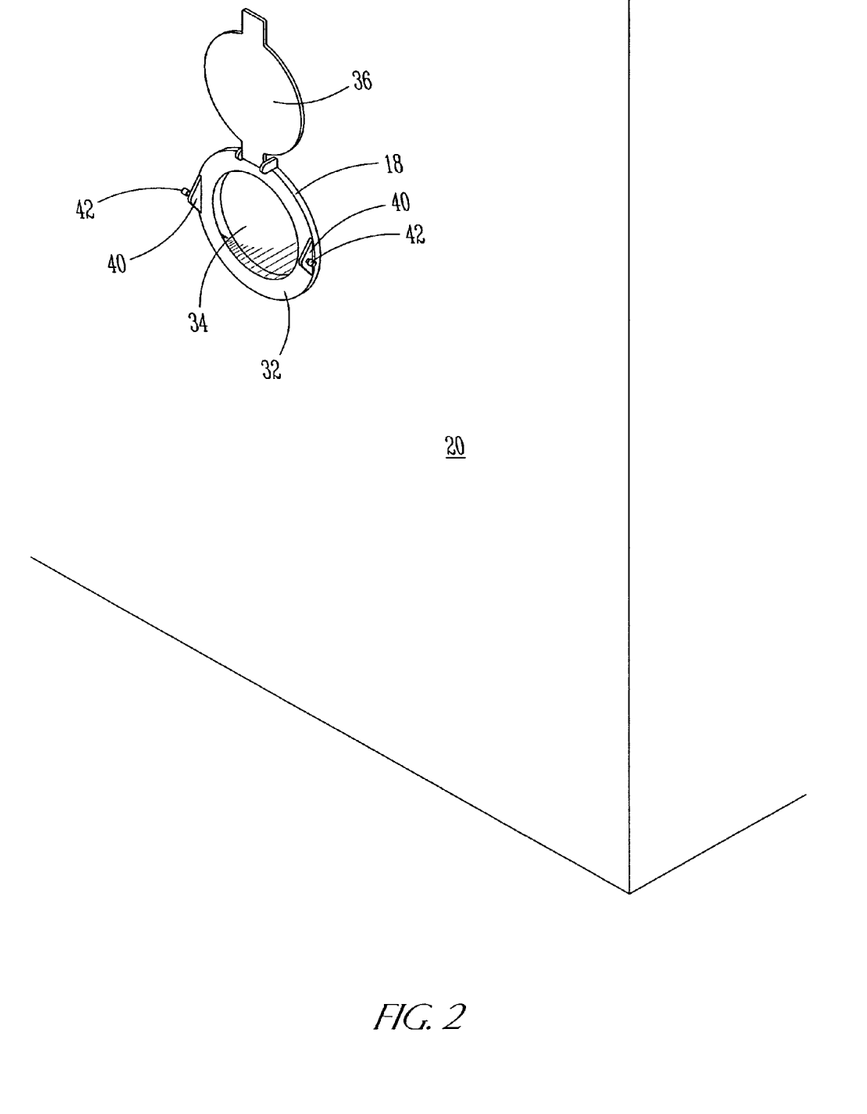
FIG. 2 shows the side of the building seen in FIG. 1 and showing an inlet port in the building sidewall that includes a receptacle that forms a part of the present invention.
Figure 3:
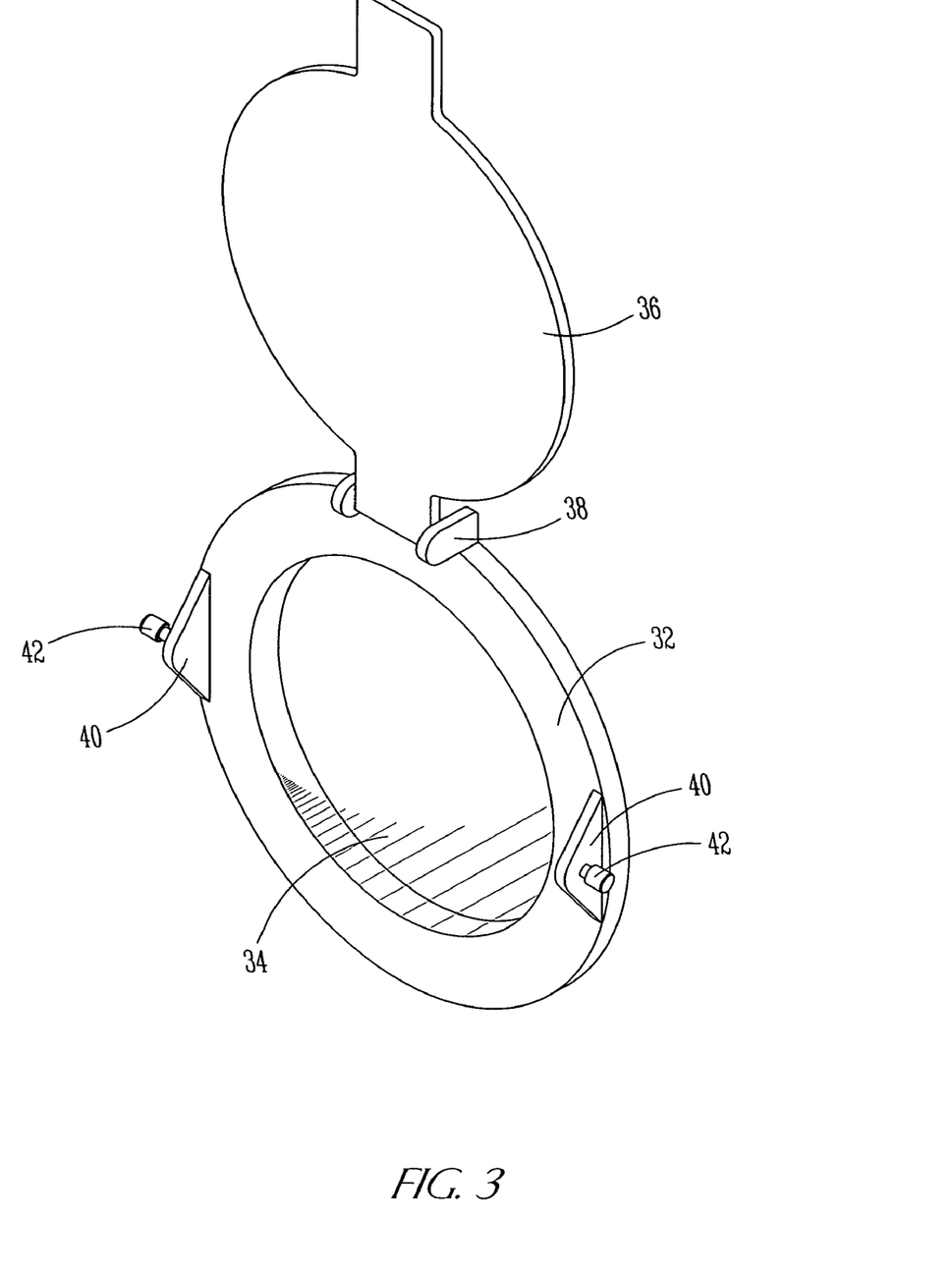
FIG. 3 is an enlarged view of the receptacle shown in FIG. 2.

As indicated in FIG. 2, the inlets 18, 26 and 28 each have a nozzle receiving receptacle 30 that is formed of an outer flange 32 and a sleeve portion 34 that extends inwardly from the flange 32. To be able to close off the receptacle 30 when not in use, it includes a door 36 that is pivotally connected at 38 to provide easy access into the sleeve portion 34 when desired. Also, the flange 32 of the receptacle 30, as best shown in FIG. 3, has a pair of lugs 40 located on opposite sides of the flange 32 and each including an outwardly extending securement pin 42 for a purpose as will be described below.

Figure 4:
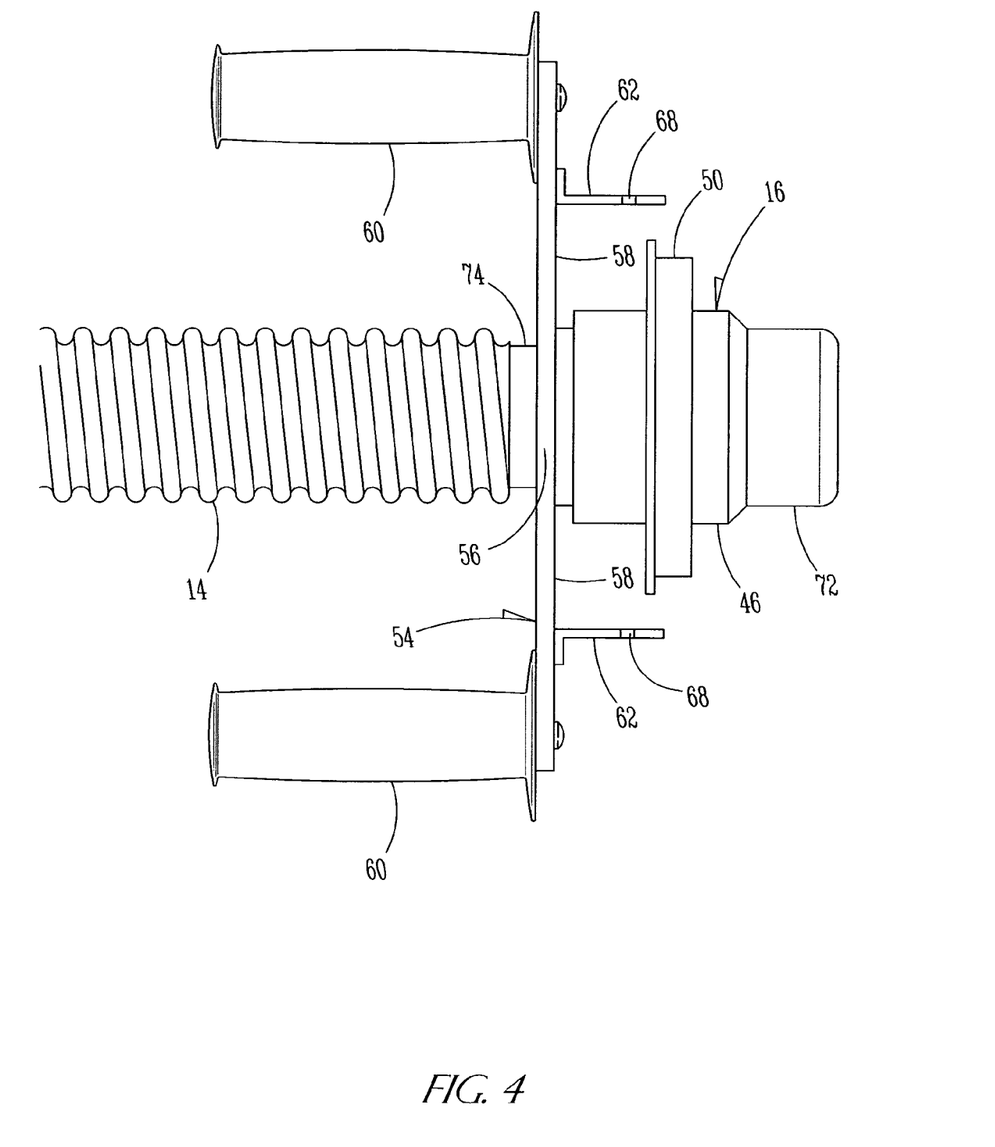
FIG. 4 is a side view in elevation of a hose and a hose on which a nozzle is attached to the outer end, which hose and nozzle form part of the preferred embodiment of the present invention.
Figure 5:
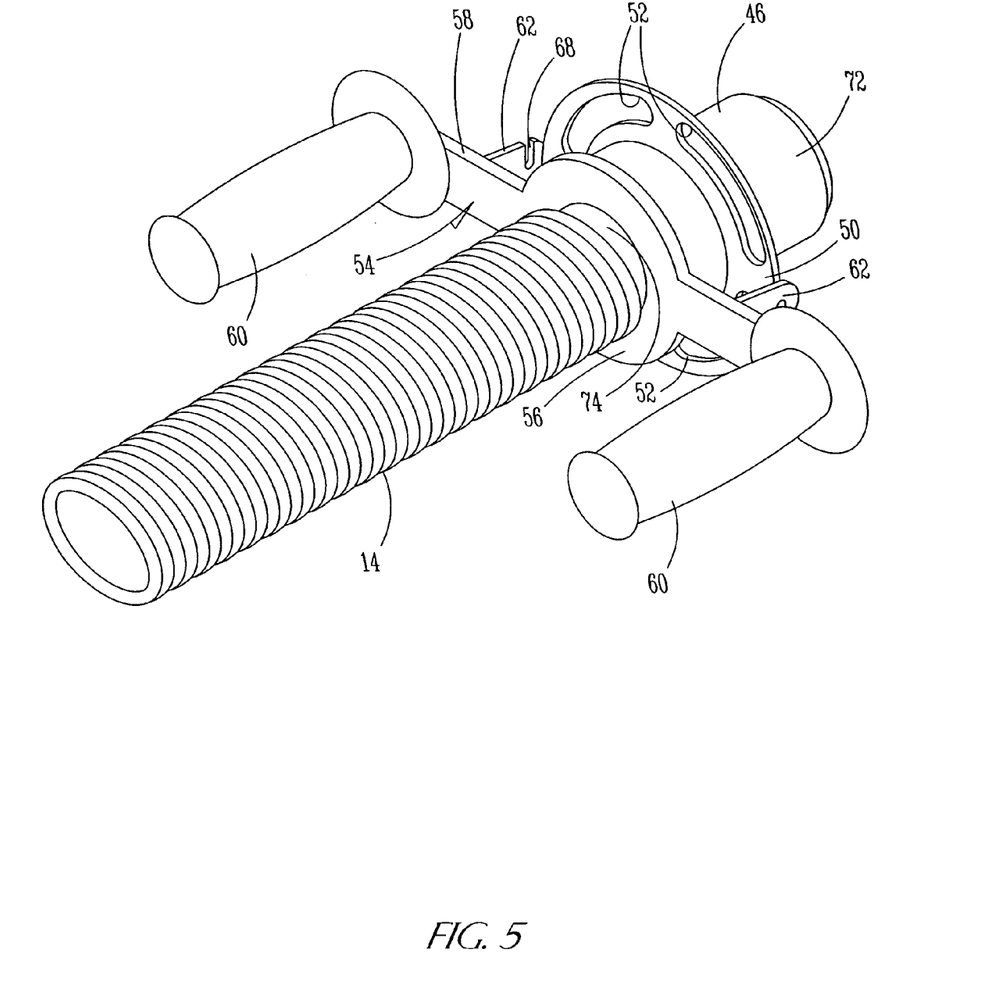
FIG. 5 is a perspective view of the hose and nozzle of FIG. 4.
Figure 6:
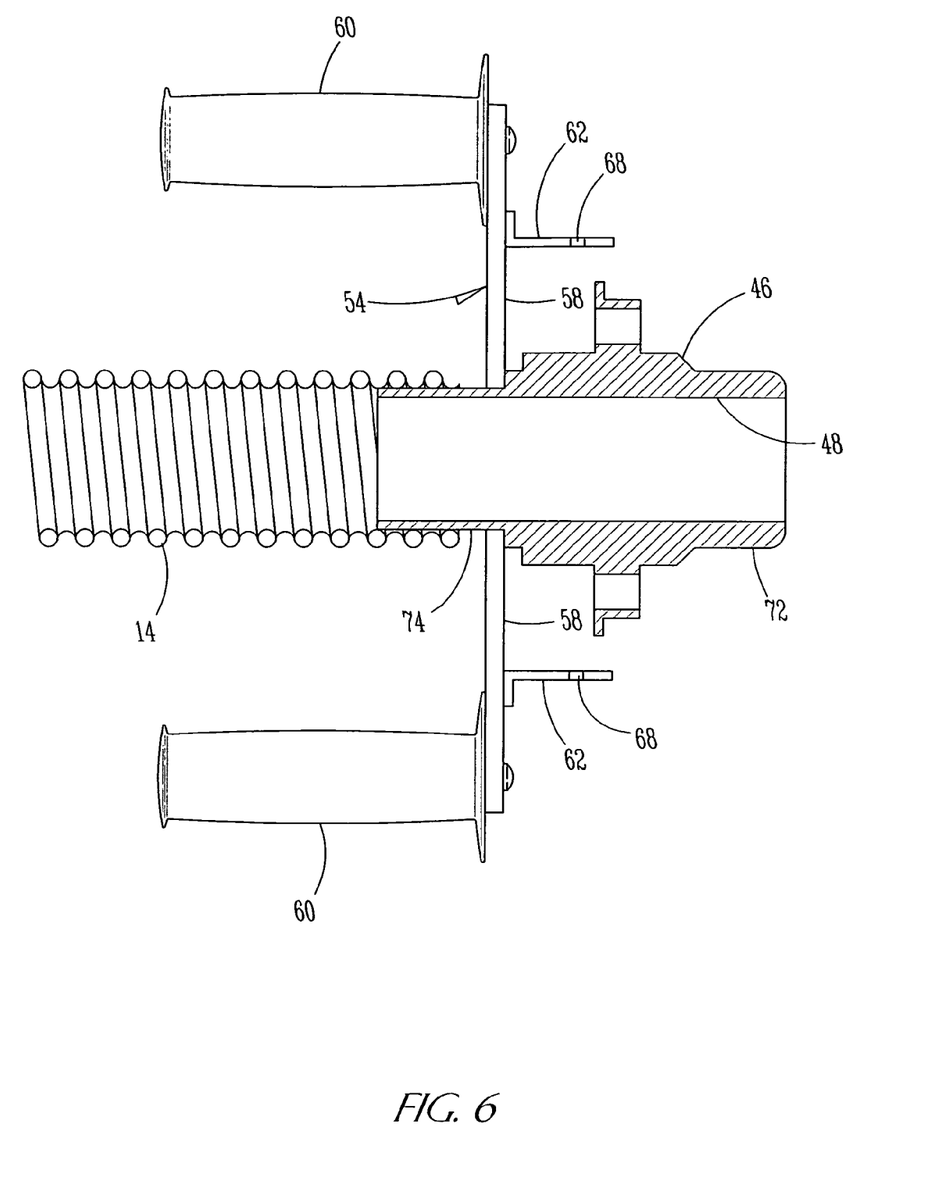
FIG. 6 is a side view in elevation similar to that of FIG. 4, but showing the hose and nozzle in section.
Figure 7:
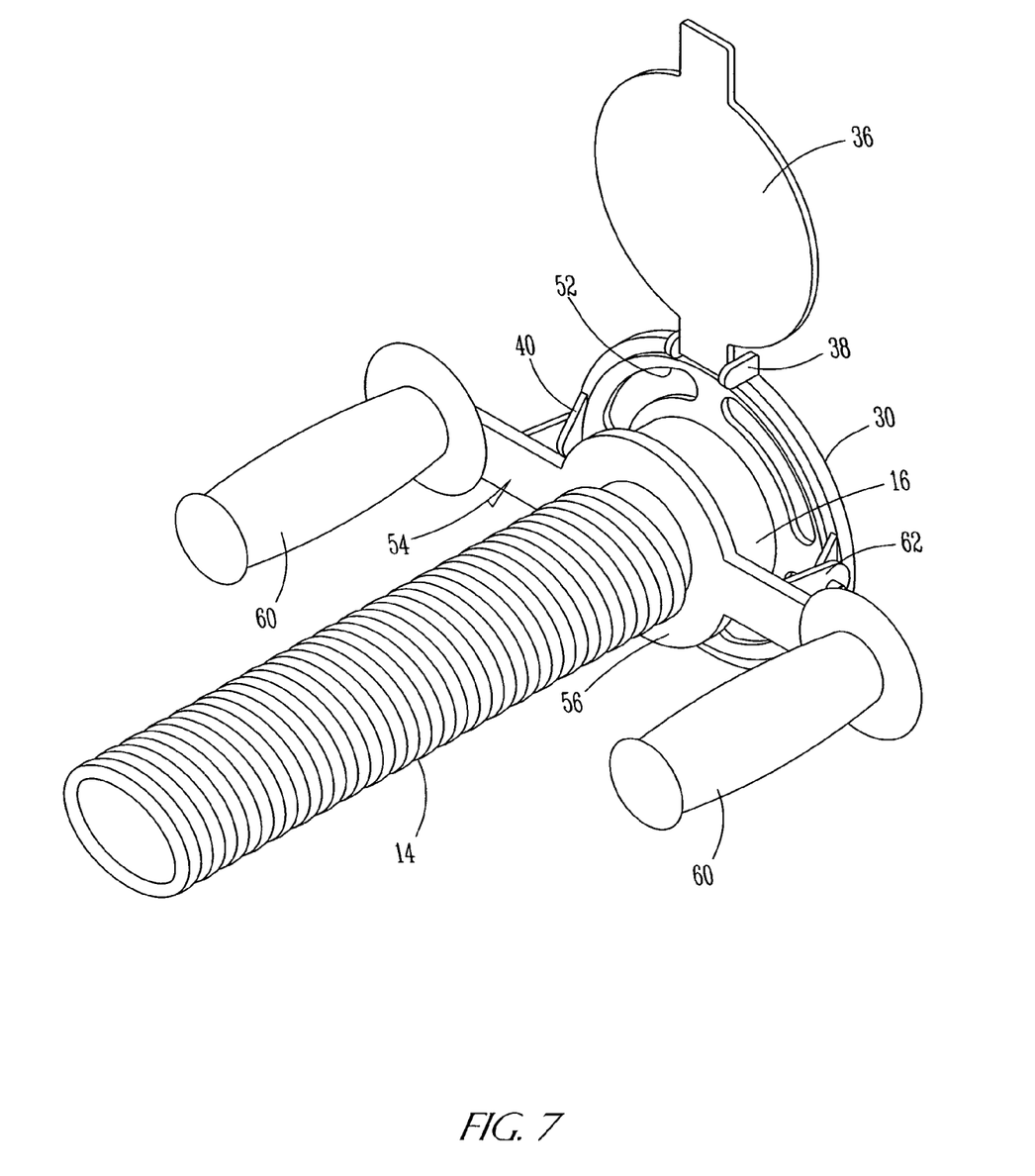
FIG. 7 is a perspective view showing the hose and nozzle of FIG. 5 in engagement with the receptacle of FIG. 2.

Referring now to FIGS. 4, 5 and 6, the nozzle 16 has a body portion 46 that includes a central bore 48 (see FIG. 6) axially aligned in the body portion 46. Approximately at the midportion of the body portion 46 the nozzle 16 also has a flange 50 extending radially outwardly from the exterior of the body portion 46. As can be seen best in FIG. 5, the flange 50 is not a solid piece, but instead has several slots 52 that allow for air to flow into the building 10 as the fog is being sprayed therein. Forward of the flange 50, the nozzle 16 has an extension arm assembly 54 that is formed of a mounting center portion 56 that encircles and is secured to the body portion 46 and has forwardly extending arms 58.

The arms 58 are oppositely spaced from one another and each include a handle 60 extending outwardly from one side thereof that is used for securing the nozzle 16 to the receptacle 30. The arms 58 also include hook members 62 that extend outwardly from the other side of the arms 58 in a direction opposite to that of the handles 58. Each of the hook members 62 include a slit 68 for engaging the securement pins 42 when the nozzle 16 is connected with the receptacle 30 to secure semi-permanently the nozzle 16 therein to provide the hands free operation afforded by the present invention.

As indicated by FIGS. 5 and 6, the nozzle body portion 46 has an inner end 72 that extends into the receptacle 30 and an outer end 74 on which the end of the hose 14 is mounted. Thus, to connect the nozzle 16 to the receiving receptacle 30 simply involves sticking the body portion inner end 72 into the sleeve 34 and turning the nozzle in a clockwise fashion to engage the hook members 62 with the securement pins 42. There upon, initiation of pumping the desired fog into the building 10 can begin.

It can, thus, be readily seen that the present invention provides a relatively simple, efficient and safe means for the decontamination, disinfection or delousing of buildings. Although the invention has been described with respect to a preferred embodiment thereof, it is to be understood that the invention is not to be so limited since changes and modifications can be made therein which are within the full intended scope of this invention as defined by the appended claims.

What is claimed is:

1. A fumigation apparatus for decontamination, disinfection or delousing of a building comprising:
   (a) a source of fumigation solution;
   (b) a fog generator exterior to said building having an input flow of the fumigation solution and an output flow of a fog of said solution;
   (c) a hose for conveying said fog to a building to be fumigated;
   (d) a nozzle on the outer end of said hose that is formed of:
      (1) a body portion that includes a central bore axially aligned in said body portion through which said fog is pumped into said building through at least one inlet port in a sidewall of the building;
      (2) a flange extending radially outwardly from said body portion and coaxially aligned with said bore, said flange including at least one slot so that when said apparatus is pumping said fog into said building air is drawn through said at least one slot as a result of a venturi effect to improve the flow of fog into said building.

2. The fumigation apparatus of claim 1 wherein said nozzle further includes a pair of oppositely positioned extension arms extending outwardly from said body, each of said arms having a handle on one side aligned parallel with said bore and an engagement member on the other side.

3. The fumigation apparatus of claim 2 wherein said inlet port of said building has a nozzle receiving receptacle disposed therein, said receptacle having an outer flange on which at least one securement pin is mounted for engaging at least one of said engagement members on said nozzle to secure said nozzle in said receptacle.

4. The fumigation apparatus of claim 2 wherein said nozzle has at least two engagement members that are hook shaped.

5. The fumigation apparatus of claim 4 wherein said nozzle is secured to said receptacle by sticking the body portion into the receptacle sleeve and turning the nozzle to engage said engagement members with securement pins of the inlet port.

6. The fumigation apparatus of claim 1 wherein said receptacle has a centrally located aperture with an associated sleeve for receiving the body portion of said nozzle and being sized to conform to the shape of the nozzle flange.

7. The fumigation apparatus of claim 1 wherein said fog generator is an ultra-low-volume cold fog unit having a blower rating of 150-400 cfm.

8. The fumigation apparatus of claim 7 wherein said fog generator produces a fumigation fog comprised of droplets ranging in size from 5-50 microns.

9. The fumigation apparatus of claim 1 wherein said flange has a plurality of slots through which air is drawn into said building.

10. The fumigation apparatus of claim 1 wherein said fog generator produces a fumigation fog comprised of droplets ranging in size from 5 to 50 microns.

* * * * *